United States Patent [19]

Schiel

[11] Patent Number: 4,643,802

[45] Date of Patent: Feb. 17, 1987

[54] EXTENDED NIP PRESS WITH HEATING EFFECTS AVOIDANCE

[75] Inventor: Christian Schiel, Heidenheim, Fed. Rep. of Germany

[73] Assignee: J. M. Voith GmbH, Fed. Rep. of Germany

[21] Appl. No.: 717,858

[22] Filed: Mar. 28, 1985

[30] Foreign Application Priority Data

Jan. 31, 1985 [DE] Fed. Rep. of Germany ....... 3503245

[51] Int. Cl.[4] .............................................. D21F 3/02
[52] U.S. Cl. .................................... 162/358; 100/153; 162/205; 162/361
[58] Field of Search ....................... 162/205, 358, 361; 100/93 RP, 121, 153; 29/116 AD

[56] References Cited

U.S. PATENT DOCUMENTS

| | | | |
|---|---|---|---|
| 3,726,338 | 4/1973 | Sorenson | 29/116 AD |
| 4,064,607 | 12/1977 | Wolf | 29/116 AD |
| 4,287,021 | 9/1981 | Justus et al. | 162/358 |
| 4,296,537 | 10/1981 | Kusters et al. | 29/116 AD |

FOREIGN PATENT DOCUMENTS

| | | |
|---|---|---|
| 0066528 | 12/1982 | European Pat. Off. |
| 2165118 | 9/1972 | Fed. Rep. of Germany |
| 2502161 | 7/1976 | Fed. Rep. of Germany |
| 2629185 | 12/1977 | Fed. Rep. of Germany |
| 2905542 | 8/1980 | Fed. Rep. of Germany |
| 3030233 | 2/1982 | Fed. Rep. of Germany |

Primary Examiner—S. Leon Bashore
Assistant Examiner—K. M. Hastings
Attorney, Agent, or Firm—Ostrolenk, Faber, Gerb & Soffen

[57] ABSTRACT

An extended nip press for removal of water from a web of fibers experiences a press shoe expansion and deformation problem due to uneven heating of the press shoe under load. The press nip includes a rotatable press roll, which is opposed to a press shell or jacket that rides over a press shoe that is supported in a recess on a supporting member. The press shoe has an upper part with a top surface on which the press belt slides through the press nip and has a lower supporting part. The upper and lower parts are heat insulated by an inserted insulating layer. The upper and lower parts are form locked by a spline connection toward the inlet side of the press nip. To avoid heat-caused deformation of the press shoe, the lower supporting part has a greater moment of resistance against flexure than the upper part due to their respective cross-sections. Further, the upper part of the press shoe, at its slide path, in the unloaded condition is deviated in shape in a direction opposite to the direction in which the press shoe deforms upon heating, so that upon heating, the press shoe will assume a normal desired shape.

6 Claims, 5 Drawing Figures

4,643,802

EXTENDED NIP PRESS WITH HEATING EFFECTS AVOIDANCE

BACKGROUND OF THE INVENTION

The present invention relates to an extended nip press for the removal of water from a web of fibers. An extended press nip is defined between a rotatable press roll and an endless rotatable belt which is pressed against the press roll by a press shoe. The press shoe is, in turn, supported on a non-rotating support member, and is particularly supported in a recess in that support member. The press shoe has an upper part which is pressed against the press jacket and defines a slide path and has a lower part which is the supporting part in the supporting member.

Such an extended nip press is known from U.S. Pat. No. 4,287,021. In that press, a film of lubricating oil is produced between the rotatable belt or shell or jacket, which consists of reinforced rubber, and the slide path on the upper part of the press shoe in order to reduce the friction in the press nip between the belt and the press shoe. In the journal, "Wochenblatt für Papierfabrikation," Issue No. 22 (1984), page 83 f., in the description of a similar extended nip press, it is pointed out that the heat produced in the press nip between the moving parts is removed by the lubricating oil.

In this type of press, there are extremely high demands, with regard to the geometry of the press nip, between the corresponding portion of the shell of the rotating press roll and the slide path of the press shoe, which is guided in a stationary support member. The unavoidable heating of the press shoe is disadvantageous with respect to these demands.

SUMMARY OF THE INVENTION

The object of the present invention is to substantially avoid impermissible deformation of the press shoe as a result of the action of heat and/or to compensate for a deviation in the shape of the slide path.

This object is achieved by insulating the supported upper part of the press shoe, which is in contact with the press jacket, from the supporting lower part of the press shoe. Such insulating is accomplished, for example, by installing an insulating layer between the upper and lower parts of the press shoe. This solution is advantageous because heat transfer to the lower part of the press shoe is strongly reduced by the insulation. As a result, the press shoe is subject only to a slight and therefore controllable deformation.

Federal Republic of Germany Pat. No. 30 30 233 shows an extended nip press of the aforementioned type having a two-part press shoe, in which the upper part of the press shoe consists of rubber, which is a poor conductor of heat, and the lower part consists of metal. At the surface of contact between the rubber and metal parts, grooves are provided which extend in the longitudinal direction of the press shoe. Cooling liquid can be conducted through these grooves in order to protect the temperature-sensitive upper part from overheating. Thus, the patent is based on a different teaching than the invention.

The insulating layer keeps heat transfer from the upper part to the lower part of the press shoe as small as possible. A pressure-resistant insulating material can be employed to transfer the pressing force from the lower part to the upper part of the press shoe.

The upper and lower parts of the press shoe are held to each other in form locked manner. For example, they are provided with a spline and groove connection. That connection is particularly provided at the inlet side of the press nip with respect to the direction of movement of the press belt through the press nip. Over the remainder of the opposed surfaces of the uppper and lower parts of the press shoe, they are insulated from each other. The form lock connection transmits the frictional force acting on the upper part of the press shoe to the lower part and this, in turn, transmits the force into the stationary support member. The form lock is more effective when it is placed in the inlet region of the press shoe, at which lower temperatures occur, than on the outlet side of the press nip. In this way, only a slight heat flow can take place from the upper part of the press shoe to the lower part.

Preferably, the cross-section of the lower part of the press shoe has a greater amount of resistance against flexure with respect to an axis extending perpendicularly to the slide path of the press belt over that press shoe than the cross-section of the upper part of the press shoe has. This development counteracts the deformation of the press shoe, which might occur because the outlet side of the upper part of the press shoe is subjected to a higher temperature than the inlet side.

Because the outlet side of the press nip with respect to the direction of movement of the press belt is at a higher temperature than the inlet side of the press nip, there would be greater heat-caused expansion of the outlet side of the press shoe than of the inlet side. Such uneven heating deforms the press shoe. Therefore, the press shoe may be developed with a normal deformation that is counter to the deformation expected upon heating of the press shoe. As the press shoe is heated and it expands and deforms due to the expansion, the press shoe thereby can assume the desired shape for optimum operation. Upon operation of the press, the slide path of the press shoe assumes the desired association with respect to the shell or jacket of the press roll since the influences acting on the press shoe counteract the pre-established deviation in its shape.

Other objects and features of the invention will be described in further detail below with reference to the accompanying drawings.

DESCRIPTION OF A PREFERRED EMBODIMENT

Figure 1:
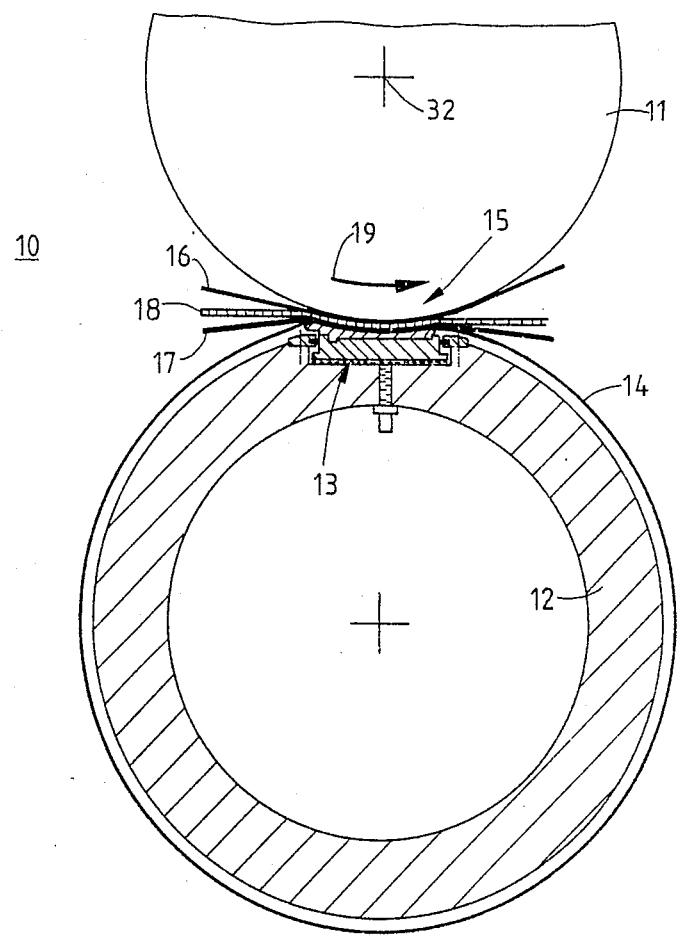
FIG. 1 shows diagramatically an extended nip press, having a press roll and a support member shown in cross-section, with a press shoe guided in the support member in order to produce the extended press nip.

In FIG. 1, the extended nip press 10 includes a rotatable driven press roll 11. There is an associated stationary support member 12 which extends parallel to the roll 11. A press shoe 13 is guided on the support member for motion and for exerting force out of the support member. The press shoe 13 can be pressed by pressure oil in a recess behind the press shoe toward the press roll 11.

An endless shell or jacket 14 of flexible plastic fabric, coated on its inside with plastic, is passed around the support member 12 and its press shoe 13. The press shoe 13 forms an extended press nip 15 with the corresponding portion of the shell or jacket of the press roll 11.

Through this extended press nip, an upper felt web 16 and a lower felt web 17 are fed, together with a web of fibers 18, from which the water is to be removed, which fiber web is being disposed between the felt webs. The webs are conducted together with the press jacket 14 in the direction 19 of travel of the web. The undriven press shell or jacket 14 is driven by the lower felt web 17. The press shell or jacket 14 can also be developed as an endless belt which is guided around several guide rollers on both sides of the press shoe 13.

Figure 2:
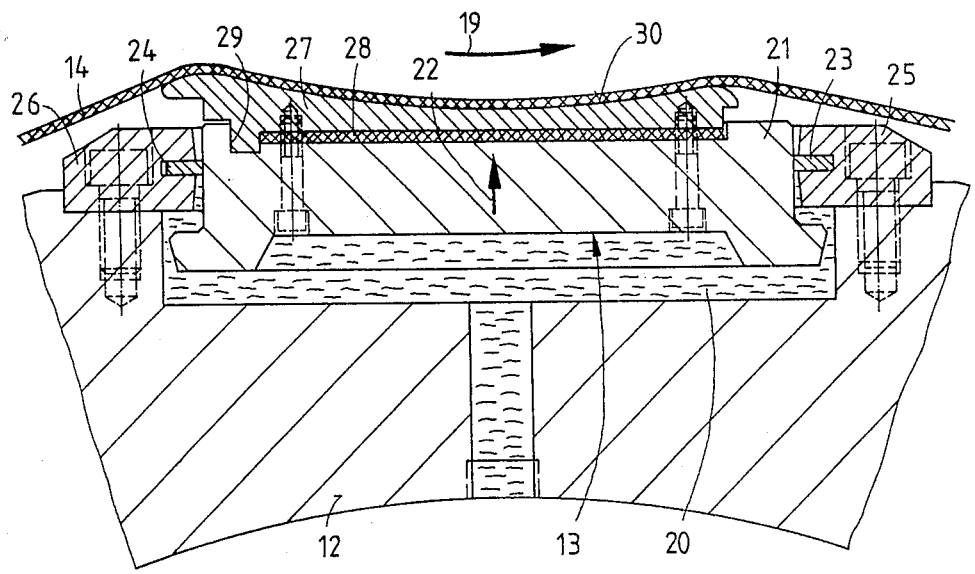
FIG. 2 shows a portion of the support member with the press shoe on a larger scale than in FIG. 1.

As shown in FIG. 2, the press shoe 13 is comprised of several parts. The press shoe 13 which extends parallel to the longitudinal axis of the press roll 11 includes a supporting element in form of a lower part 21 which is arranged in a recess 20 in the support member 12. This part 21 is movable radially in the direction toward the press roll 11, which is the pressing direction 22, as a result of the pressure oil fed to the recess 20. In this connection, support ledges 23 and 24, which act laterally on the lower part 21 of the press shoe, assume both a pressure shoe guiding and a recess sealing function. The support ledges 23, 24 are guided in respective holders 25 and 26 which are screwed to the support member 12. The support ledges are arranged to completely surround the press shoe 13.

As shown in FIG. 2, the upper and lower parts of the press shoe are nonpivotably connected. To the lower part 21 of the press shoe, there is screwed an upper part 27, which is radially substantially thinner in cross-section. Therefore, the lower part 21 is less deformable than the upper part 27. Between the two parts 21 and 27 of the press shoe 13, there is inserted an insulating layer 28 which insulates the predominant portion of the facing surfaces of the two parts of the press shoe from each other. It is only in the region of the inlet side of the press shoe 13 that the two press shoe parts 21 and 27 have direct contact as a result of a groove and spline connection 29 which produces a form lock. This connection serves to transmit the frictional force acting on the upper part 27 of the press shoe to the lower part 21 upon operation of the press.

The outer surface of the upper part 27 of the press shoe has a slide path 30 along which the belt 14 travels. The slide path 30 is concavely shaped to conform to the jacket surface of the mating press roll 11, with due consideration for the thickness of the two felt webs 16, 17 that are conducted through the press nip 15, along with the fiber web 18 and the press shell or jacket 14. Also, the shape of the slide path is adapted to the desired course of the pressing pressure over the axial deviation width as well as the circumferential length of the press nip. However, the slide path includes roundings on the inlet and outlet sides of the path through the nip. In other words, disregarding its inlet and outlet edge zones, the slide path 30 must form a surface which is approximately parallel in cross-section and exactly parallel in the longitudinal direction to the jacket surface of the mating cylindrical press roll 11, and that guide path surface has a straight longitudinal axis with a greater radius than that of the press roll 11.

During the operation of the extended nip press 10, various factors affect the accuracy of the shape of the slide path 30. There is the frictional force of the oil-lubricated press shell or jacket 14 which acts on the upper part 27 of the press shoe. Also, there is heating of the press shoe 13 which is caused by friction. Practical experience on an extended nip press with lengthened press nip, but including a press shoe that is not developed in accordance with the invention, has shown that a considerable temperature difference arises during operation under load between the inlet and outlet sides of the upper part of the press shoe. Due to thermal expansion this temperature difference causes lengthening of the press shoe in the axial direction, transverse to the direction of travel of the web, and that lengthening increases from the inlet side to the outlet side of the nip. The press shoe is arcuate in the plan view of the slide path. The thermal expansion causes a change in the curvature of the press shoe which results in considerable non-parallelism of the press nip and also lifts the press shoe off its supporting ledges, which are displaceable within limits. It furthermore causes a clamping and canting of the shoe between the holders. As a result, the press pressure cannot be maintained at constant value over the length of the press shoe, and damage is caused to the supporting ledges.

In the press shoe 13 according to the invention, the upper part 27 is comprised of a bronze metal of low thermal conductivity. However, materials such as polyamide or ceramics can also be used. The material of the upper part 27 may be selected to be a good heat insulator which insulates the lower part 21 of the press shoe from heat transmitted from the slide path 30. As a result, a separate, installed insulating layer between the two parts of the press shoe can possibly be avoided. The greatest part of the heat occurring in the slide path 30 is therefore taken up and led away by the press jacket 14 and the lubricating oil beneath the jacket. In this way, a temperature difference is established over the circumferential legnth of the upper part 27 of the press shoe of an amount of about 10° C. For example, with a temperature of 40° C. at the inlet side, there is a temperature of about 50° C. on the outlet side. Only a small part of the heat taken up by the upper part 27 of the press shoe is transmitted via the inlet-side groove and spline connection 29 to the lower part 21 of the press shoe. Also, this heat transmitting connection is toward the inlet side, where the temperature in the upper part is the lowest.

An insulating layer 28 which is comprised, for instance, of a plastic-fiber laminated substance, greatly reduces heat transfer between the opposed facing surfaces of the upper part 27 of the press shoe and the lower part 21 so that the temperature at the outlet side of the lower part 21 of the press shoe increases by only about 2° C., as compared with the temperature at the inlet side. Obtaining only such a slight increase in temperature is further supported by the fact that the lower part 21 of the press shoe is comprised of a material having a much higher thermal conductivity than the material of the upper part 27 of the press shoe. Therefore, there is more temperature equalization produced in the lower part 21 of the press shoe, and this maintains the lengthening of the outlet side of the lower part of the press shoe, as compared with the inlet side, within narrow limits.

As a modification of the embodiment just described, heat transfer from the upper part 27 of the press shoe to the lower part 21 can be restricted by means of the two parts resting against each other along ribs formed thereon, and the spaces between the ribs being filled with air or oil. A special insulating layer can then be dispersed with.

Since the heat influence in the lower part 21 of the press shoe causes a slight change in the axial length of the lower part on the outlet side of the press shoe while the heat influence in the upper part 27 causes a greater change of axial length, further measures are taken to maintain the parallelism of the press nip 15.

As can be seen in the press shoe 13 in FIG. 2, the cross-section of the supporting lower part 21 of the press shoe has a much greater moment of resistance to flexure with respect to an axis extending at right angles to the slide path surface 30 than the cross-section of the upper part 27 of the press shoe. The greater deformation of the upper part 27 of the press shoe which is caused by the higher temperature difference is therefore active only to a very much smaller extent in the supporting lower part 21.

Furthermore, the curvature of the press shoe 13 which extends approximately parallel to the plane of the slide path is counteracted as a result of the action of the heat, for the most part by the action of the frictional force on the press shoe 13.

Figure 3:
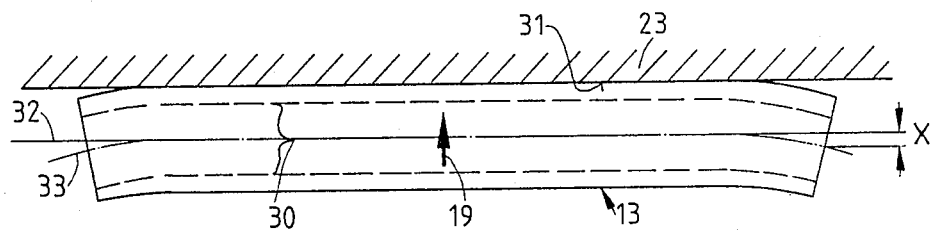
FIG. 3 is a plan view of the same press shoe, deformed upon operation of the press, shown in a diagrammatic view and in greatly reduced size.

FIG. 3 is a greatly simplified plan view of the press shoe 13. The frictional force which acts in the direction 19 of travel of the web presses the press shoe 13 against the outlet-side supporting surface 31 of the supporting strip 23. Only the lateral end sections of the press shoe 13 do not follow the linear course of the supporting surface 31. This is not disadvantageous in practice with respect to the sealing of the press shoe 13 in the recess 20 of the cross member 12 since the supporting ledges 23 and 24 which surround the press shoe are applied against the press shoe on the one side by spring action and on the other side by oil pressure. The deviation of the press shoe from the linear supporting surface 31 on the end side amounts to only a few tenths of a millimeter so that clamping of the press shoe 13 on the support member 12 can be avoided by suitable play.

Figures 4, 5:
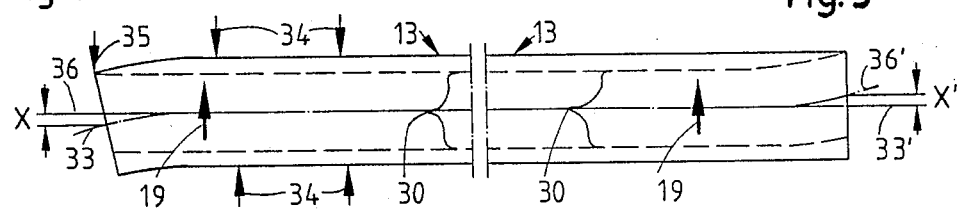
FIG. 4 is a plan view of an end fragment of the press shoe during the working of its slide path on the side of the press nip.
FIG. 5 is also a plan view of an end fragment of the press shoe after the working of its slide path.

With a press shoe 13 whose slide path 30 is produced in the straight undeformed condition of the shoe and accordingly extends precisely in the longitudinal direction of the shoe, non-parallelism of the press nip 15 and of the longitudinal axis of the slide path 30 to the longitudinal axis of the press roll 11 occurs upon practical operation at the end sections for the reasons described above. This is shown in FIG. 3. The straight dash-dot line 32 represents the longitudinal axis of the press roll 11, and the dash-dot line 33, which is curved at its ends, represents the longitudinal axis of the press shoe 13 and the slide path 30 shown in dashed line. The displacement of the slide path 30 at the ends from the direction 19 of the travel of the web is indicated in FIG. 3 by the dimension X. This deformation of the slide path 30 can be eliminated in the press shoe 13 if at the time of the manufacture of the slide path 30, it is imparted a deformation of a size equal to and in a direction opposite to that which thereafter occurs under load upon operation of the wet press 10. In FIG. 4, the press shoe 13 is held in its middle region with a straight longitudinal axis 33 between clamping means 34, such as clamping screws, or the like. Corresponding to the deformation under load, the end sections of the press shoe 13 are strained by the same amount X with respect to the direction 19 of travel of the web by the clamping means 35. In this condition of the press shoe 13, the slide path 30 is now produced with a straight longitudinal axis 36. After unclamping of the press shoe 13 (shown in FIG. 5), the slide path assumes a shape in which its end sections in the direction of travel 19 of the web are curved by the amount X' with respect to the now straight longitudinal axis 33' of the press shoe. This deviation in shape, however, as previously described, is compensated for by the deformation of the press shoe 13 upon the operation of the press as a result of the action of heat and frictional force so that, under load, a constant parallelism of the press nip 15 is established over the entire length of the press shoe 13.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An extended nip press for removing water from a fiber web, the press comprising:
   a rotatable press roll which is rotatable around an axis of the press roll;
   a press shoe having a top surface that is opposed to the press roll; a stationary support member for carrying the press shoe and for urging the press shoe and the top surface thereof toward the press roll;
   an endless belt extending between the top surface of the press shoe and the press roll for defining a press nip between the belt and the press roll, and the belt being movable in a slide path through the nip by the rotation of the press roll;
   the press shoe being comprised of a supporting lower part which is supported on the support member and of an upper part which is supported on the lower part, and the upper part having the top surface of the press shoe which defines the slide path for the press belt; the lower and the upper parts of the press shoe having non-pivotable interlocking means;
   means defining a recess in said stationary support; the lower part of the press shoe being positioned in the recess of the stationary support; the recess defining means also maintaining the position of the press shoe against the friction exerted by the belt; and
   a continuous layer of heat insulating material between the upper part of the press shoe and the lower part of the press shoe for preventing heat flow from the upper part to the lower part, said continuous layer being disposed over substantially the whole area between the upper and lower parts of the press shoe.

2. The extended nip press of claim 1, wherein with respect to the path of the press belt, the press shoe and the press nip have an inlet side and an outlet side; the upper and lower parts, interlocking means further comprising the upper and lower parts of the press shoe being connected to each other by form locking means in the region of the inlet side, and the insulating material between the upper and lower parts for insulating those parts from each other is disposed over the area between the upper and lower parts which are not occupied by the form locking means.

3. The extended nip press of claim 1, wherein the upper part and the lower part of the press shoe have respective cross-sections such that the lower part has a greater moment of resistance against flexure with respect to an axis extending at right angles to the slide path of the press belt than the upper part; the press shoe having a tendency to deviate in its unloaded condition in a direction opposite the direction in which the press shoe deforms under load.

4. An extended nip press as in claim 1, wherein the lower part of the press shoe has a higher moment of bending resistance in relation to an axis that extends at a right angle to the sliding path than does the upper part of the press shoe.

5. An extended nip press as in claim 1, wherein the upper and lower parts of the press shoe interlocking means comprises a groove and spline connection therebetween.

6. An extended nip press as in claim 1, wherein the upper part of the press shoe is comprised of thermally conductive metal.

* * * * *

UNITED STATES PATENT AND TRADEMARK OFFICE
CERTIFICATE OF CORRECTION

PATENT NO. : 4,643,802
DATED : February 17, 1987
INVENTOR(S) : Christian Schiel

It is certified that error appears in the above-identified patent and that said Letters Patent is hereby corrected as shown below:

On the title page:

Item [30], change "3503245" to -- 35 03 240--.

Signed and Sealed this

Third Day of August, 1993

Attest:

MICHAEL K. KIRK

*Attesting Officer*  *Acting Commissioner of Patents and Trademarks*